US010333703B2

(12) United States Patent
Arnold et al.

(10) Patent No.: US 10,333,703 B2
(45) Date of Patent: Jun. 25, 2019

(54) KEY EXCHANGE PROCESS

(71) Applicant: International Business Machines Corporation, Armonk, NY (US)

(72) Inventors: Todd W. Arnold, Charlotte, NC (US); Richard V. Kisley, Charlotte, NC (US); Michael J. Miele, Concord, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 289 days.

(21) Appl. No.: 15/446,570

(22) Filed: Mar. 1, 2017

(65) Prior Publication Data

US 2018/0254894 A1 Sep. 6, 2018

(51) Int. Cl.
*H04L 9/08* (2006.01)
(52) U.S. Cl.
CPC .......... *H04L 9/0844* (2013.01); *H04L 9/0822* (2013.01)
(58) Field of Classification Search
CPC .......... H04L 63/0853; H04L 63/061; H04L 63/205; H04L 63/06; H04L 63/0876; H04L 63/0435; H04L 63/045; H04L 9/0819; H04W 12/04
See application file for complete search history.

(56) References Cited

U.S. PATENT DOCUMENTS

| 8,116,455 | B1 | 2/2012 | Sussland et al. |
| 8,615,081 | B2 | 12/2013 | Arnold et al. |
| 2002/0191797 | A1 | 12/2002 | Perlman |
| 2005/0193203 | A1* | 9/2005 | Freeman ............. H04L 63/0442 713/171 |
| 2006/0242407 | A1 | 10/2006 | Kimmel et al. |
| 2012/0308001 | A1 | 12/2012 | Arnold et al. |
| 2015/0023501 | A1 | 1/2015 | Taylor et al. |
| 2015/0319166 | A1* | 11/2015 | Arnold ............... H04L 63/0853 713/159 |
| 2016/0173279 | A1 | 6/2016 | Arnold et al. |

OTHER PUBLICATIONS

White Paper, "iOS Security", IOS 9.3 or later, Apple, May 2016, pp. 1-63. URL: https://www.apple.com/business/docs/iOS_Security_Guide.pdf.

* cited by examiner

*Primary Examiner* — Brian F Shaw
(74) *Attorney, Agent, or Firm* — Cantor Colburn LLP; William Kinnaman

(57) ABSTRACT

Embodiments are directed to a computer-implemented method and system for generating a transport key. A method can include generating, using a processor, a key agreement pair comprising a public agreement key and a private agreement key in a second element. Thereafter, generating, using the processor, a transport key based on the public agreement key in a first element. Then sending, using the processor, an information blob to the second element. Finally, independently generating, using the processor, the transport key in the second element using the information blob and the private agreement key. The transport key can thereafter be used to send information securely between the first and second elements.

17 Claims, 4 Drawing Sheets

KEY EXCHANGE PROCESS

BACKGROUND

The embodiments described herein relate in general to the field of encryption. More specifically, the embodiments described herein relate to a key exchange process.

Various methods exist in support of electronic data security. Cryptography is the transformation of intelligible information into an apparently unintelligible form in order to conceal the information from unauthorized parties. Cryptography is used for various purposes, such as to protect information transmitted through communications networks or stored on data storage units. Cryptographic procedures can be used not only to protect the privacy of data but also the integrity of data. A hardware security module (HSM) is a device with a secure boundary that meets one or more of a variety of different security standards for intrusion detection and maintenance of secure data. Common cryptographic architecture (CCA) is a programming interface to the HSM and is noted for achieving secure processing of transactions using secret keys and for the management of secret keys.

The cryptographic transformation of data is ordinarily defined by a selected algorithm, or procedure, under the control of a key. Since the algorithm is normally public knowledge, protection of the transformed, or enciphered, data depends on the secrecy of the key.

SUMMARY

Embodiments are directed to a computer-implemented method for generating a transport key. The method can include generating, using a processor, a key agreement pair comprising a public agreement key and a private agreement key in a second element. Thereafter, generating, using the processor, a transport key based on the public agreement key in a first element. Then sending, using the processor, an information blob to the second element. Finally, independently generating, using the processor, the transport key in the second element using the information blob and the private agreement key.

Embodiments are further directed to a computer system for creating a transport key. The system includes a memory and a processor system communicatively coupled to the memory. The processor is configured to perform a method that includes generating a key agreement pair comprising a public agreement key and a private agreement key in a second element. Thereafter, generating a transport key based on the public agreement key in a first element. Then sending an information blob to the second element. Finally, independently generating the transport key in the second element using the information blob and the private agreement key.

Embodiments are further directed to a computer program product for generating a transport key. The computer program product includes a computer-readable storage medium having program instructions embodied therewith, the program instructions readable by a processor system to cause the processor system to perform a method that includes generating a key agreement pair comprising a public agreement key and a private agreement key in a second element. Thereafter, generating a transport key based on the public agreement key in a first element. Then sending an information blob to the second element. Finally, independently generating the transport key in the second element using the information blob and the private agreement key.

Additional features and advantages are realized through techniques described herein. Other embodiments and aspects are described in detail herein. For a better understanding, refer to the description and to the drawings.

BRIEF DESCRIPTION OF THE DRAWINGS

The subject matter which is regarded as embodiments is particularly pointed out and distinctly claimed in the claims at the conclusion of the specification. The foregoing and other features and advantages of the embodiments are apparent from the following detailed description taken in conjunction with the accompanying drawings in which:

DETAILED DESCRIPTION

Figure 1:
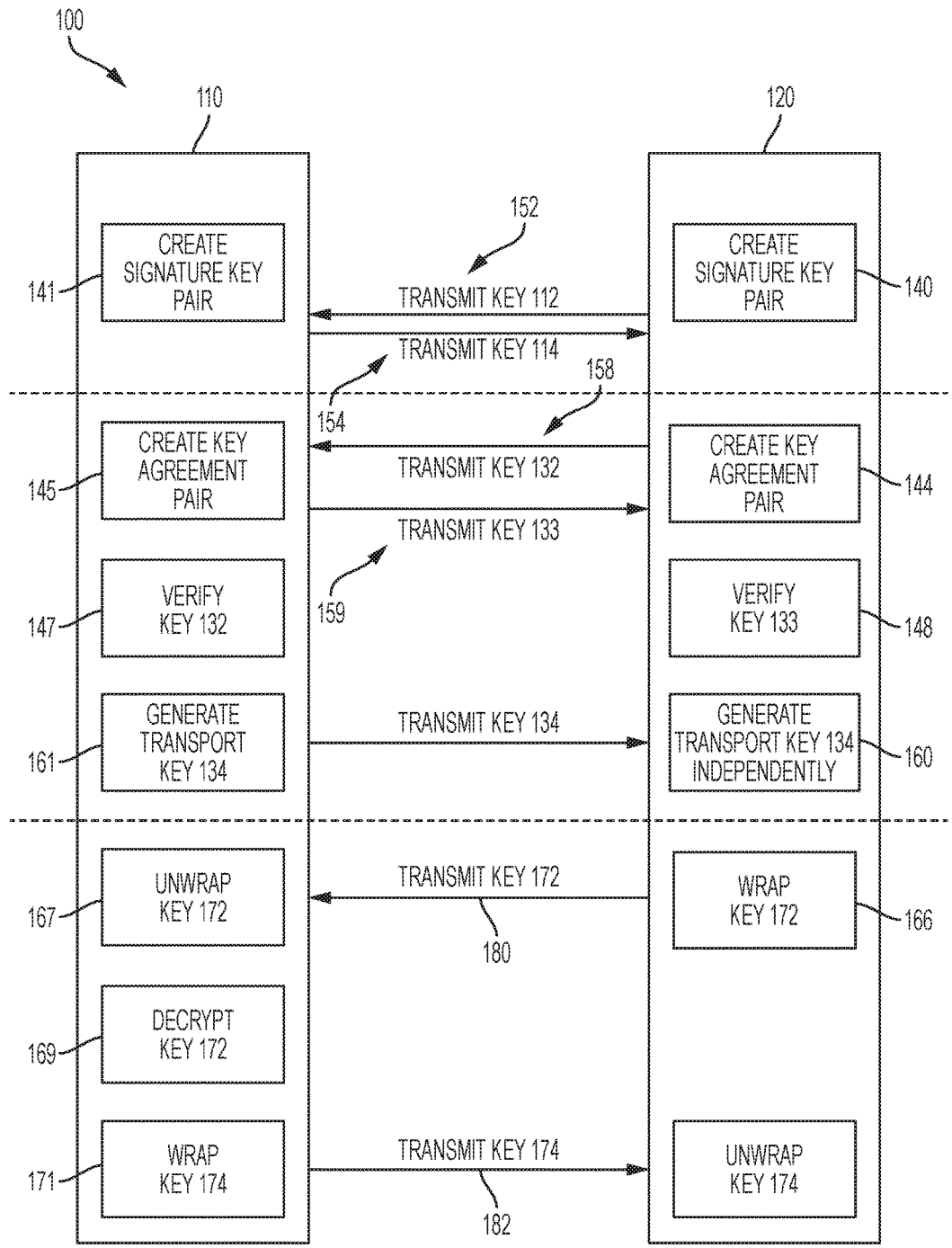
FIG. 1 depicts an overview of the operation of one or more exemplary embodiments.

Various embodiments of the present invention will now be described with reference to the related drawings. Alternate embodiments can be devised without departing from the scope of this invention. Various connections might be set forth between elements in the following description and in the drawings. These connections, unless specified otherwise, can be direct or indirect, and the present description is not intended to be limiting in this respect. Accordingly, a coupling of entities can refer to either a direct or an indirect connection.

Additionally, although a detailed description of a computing device is presented, configuration and implementation of the teachings recited herein are not limited to a particular type or configuration of computing device(s). Rather, embodiments are capable of being implemented in conjunction with any other type or configuration of wireless or non-wireless computing devices and/or computing environments, now known or later developed.

Furthermore, although a detailed description of algorithms is included herein, implementation of the teachings recited herein are not limited to embodiments described herein. Rather, embodiments are capable of being implemented in conjunction with any other type of system, now known or later developed.

At least the features and combinations of features described in the immediately present application, including the corresponding features and combinations of features depicted in the figures amount to significantly more than implementing a method and system for implementing a key exchange process. Additionally, at least the features and combinations of features described herein, including the corresponding features and combinations of features depicted in the figures go beyond what is well understood, routine and conventional in the relevant field(s).

Cryptography is the transformation of intelligible information into an apparently unintelligible form in order to conceal the information from unauthorized parties. A common form of cryptography is public-key cryptography, also known as asymmetric cryptography. Public-key cryptography uses a pair of keys, a public key, and a private key. Exemplary forms of public-key cryptography include RSA cryptography and elliptic curve cryptography (EC or ECC).

In common usage, a first user (Alice) has both a public key, that is publicly known and available and a related private key, which is known only to Alice and was created at the same time as the public key. If a second user (Bob), wishes to send a secure message to Alice, he encrypts the message using Alice's public key. The message is encrypted and only can be decrypted by Alice or someone who has Alice's private key. Asymmetric cryptography solves certain problems of symmetric cryptography, such as the fact that a symmetric key has to be in the possession of both the sender and receiver in order to work properly. The problem with that situation is that the public key must be distributed to both Alice and Bob in order to maintain security.

A public/private key pair also can be used to sign messages, in order to prove that the message actually was sent by the sender. In such a case, Alice would sign a message using her private key. Anyone who receives the message can use Alice's public key to verify her signature to confirm it was sent by Alice.

Cryptography is of such importance that there has been a growth in the use of hardware security modules (HSM), physical computing devices that safeguard and manage digital keys for authentication purposes. An HSM also provides processing for cryptography functions. Some HSM operate using common cryptographic architecture (CCA), an application programming interface (API) that allows one to obtain services from, and to manage the operation of, a cryptographic system that meets CCA specifications. An HSM can be embodied as a card that inserts into a computer system. In some embodiments, an HSM can be inserted into a Peripheral Component Interconnect Express (PCI Express or PCIe) bus of a computer system.

In a system such as an HSM, there can be a desire to move keys from one system to another. For example, one might desire to retrieve a key that is stored in the HSM and move it to a mainframe computer to which the HSM is coupled. In some embodiments, a mainframe computer can store keys for use by the HSM because the HSM needs additional storage. In many current implementations, keys are stored in an encrypted form in the HSM. Some entities request that a key is sent in encrypted form, even if the medium through which the key will be sent (e.g., an internal PCIe bus in which the HSM is inserted) cannot be accessed externally. Thus, in order for the mainframe computer to use a key, it must first have the key decrypted by the HSM.

In some embodiments, before a first key is transmitted from an HSM to another module, a second key is used to wrap the first key. The second key can be an ephemeral wrapping key. The ephemeral wrapping key can be generated using a method that allows two parties to exchange a key that is known to both parties but is never transmitted. The ephemeral key can be generated using an algorithm such as the Elliptic Curve Diffie Hellman (ECDH) algorithm. An ECDH algorithm uses a shared secret to generate a key that is known to both parties but is never exchanged. The operation of an ECDH algorithm will be described in further detail below.

With reference to FIG. 1, a sequence diagram illustrating a system 100 is shown. System 100 presents an overview the operation of an embodiment. In system 100, block 110 represents the HSM. Block 120 represents an external system to which HSM 110 is sending information. In some embodiments, HSM 110 can be embodied as an expansion card and external system 120 can include an interface where HSM 110 can be inserted. In some embodiments, external system 120 is a computer (such as a desktop computer, laptop computer, tablet, server, or mainframe) with expansion slots. In some embodiments, system 100 includes multiple computing elements (including HSM 110 and external system 120) within the same housing. In such embodiments, external system 120 and HSM 110 can be referred to as the first element and the second element, respectively. It should be understood that the order the elements does not matter, so which computing element is the first element and which is the second element can vary in different embodiments.

Among the duties fulfilled by HSM 110 is storing and/or managing cryptographic keys. For security purposes, the cryptographic keys are typically encrypted before they are stored. As explained above, when external system 120 requests a particular cryptographic key 104, a traditional embodiment would involve HSM 110 decrypting the requested cryptographic key and transmitting the decrypted key to external system 120, because the connection between HSM 110 and external system 120 is typically internal and secure. To ensure even greater security, it can be desirable to ensure that keys that are transmitted between HSM 110 and external system 120 are first encrypted such that the transmission between HSM 110 and external system 120 cannot be used if it is "sniffed" or otherwise hijacked.

There is an initial system setup (termed "Setup-S"). External system 120 creates a signature key pair (block 140). This pair can be called ext-sign-pry (the external system private signature generation key) and ext-sign-pub (the external public signature verification key). Ext-sign-pry stays private within external system 120. Ext-sign-pub is represented by key 112 and is transmitted to HSM 110 (arrow 152). Key 112 is sent within a predefined data structure called a self-signed public key data object and is verified by HSM 110. Thereafter, HSM 110 will be able to verify signatures that were created by external system 120.

HSM 110 generates its own signature verification key pair (block 141). The public signature verification key can be called card-sign-pub, represented as key 114. The private portion of this key pair (the private signature generation key, or card-sign-prv) remains in HSM 110. Key 114 is transmitted from HSM 110 to external system 120 (arrow 154). Key 114 is sent within a predefined data structure a self-signed public key data object and is verified by external system 120. Thereafter, external system 120 will be able to verify signatures that were created by HSM 110.

Thereafter follows the setup of the HSM domain (termed "Setup-D"). External system 120 creates a domain-level key agreement pair (block 144): ext-ka-pry and ext-ka-pub (illustrated as key 132). Key 132 is signed by ext-sign-prv. External system 120 then sends ext-ka-pub (key 132) to HSM 110 (arrow 158). HSM 110 verifies key 132 by using key 112 (block 147).

HSM 110 creates a domain-level key agreement pair (block 145): card-ka-pry and card-ka-pub (illustrated as key 133). Key 133 is signed by card-sign-pry. HSM 110 then sends card-ka-pub to external system 120 (arrow 159). External system 120 verifies key 133 by using key 114 (block 148).

HSM 110 then generates a transport key (key 134) at block 161. Transport key 134 is based on key 132 and the private key portion of key 133. In some embodiments, transport key 134 is generated using a Diffie-Hellman process, presented in further detail below. In addition, a first key check value is created based on transport key 134. Key check values can be created in one of a variety of different manners. In some embodiments, a key check value can be calculated by performing an NIST SP 800-38B block Cipher-based Message Authentication Code (CMAC) algorithm on a 16 byte data block filled with bytes values to 0x00.

Transport key 134 is wrapped by a random key that never leaves HSM 110. The random key is known as the CWK (check wrapping key). A key check value is created based on transport key 134. The wrapped transport key 134 is combined with the key check value into an encrypted blob. The encrypted blob is sent along with public key 114 from HSM 110 to external system 120.

External system 120 generates transport key 134 using public key 133 and the private portion of key 132. Thus, external system 120 is able to derive transport key 134 without transport key 134 ever being transmitted between HSM 110 and external system 120. To verify that transport key 134 as derived by external system 120 is the same as transport key 134 as generated by HSM 110, external system 120 generates a second key check value and compares the second key check value with the first key check value generated by HSM 110 and sent in the blob. Setup-D phase is now complete.

Thereafter follows the operational or run-time or translation phase. During operation, external system 120 sometimes needs an operational key 172 to be decrypted by HSM 110. As stated above, HSM 110 has the ability to unlock all keys used by external system 120.

Operational key 172 is stored in system 120 in a wrapped format. Encrypted operational key 172 is transmitted by external system 120 to HSM 110, along with encrypted blob at arrow 180.

HSM 110 unwraps operational key 172 (block 167) and decrypts it to a key 174 that is usable by external system 120 (block 169). HSM 110 wraps key 174 using transport key 134 (block 171) and transmits the wrapped key to external system 120 (arrow 182). Because external system 120 has the ability to decrypt items that are wrapped by transport key 134, external system 120 is able to access and use key 174 by unwrapping key 174 in block 168.

Figure 2:
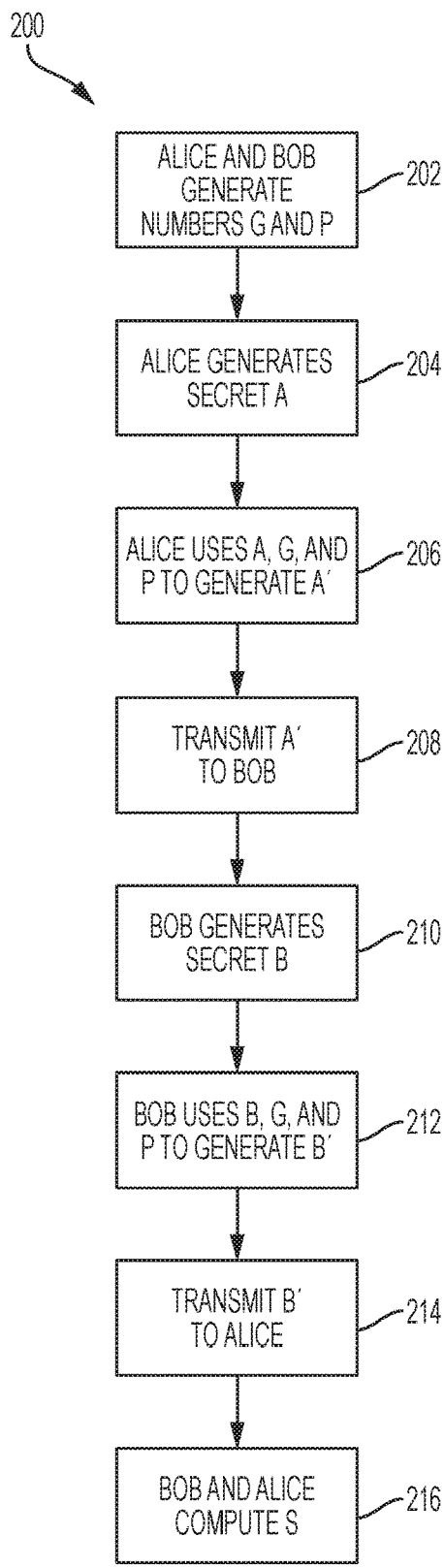
FIG. 2 depicts an overview of the operation of one or more exemplary embodiments.

Some of the processes discussed above reference the Elliptical Curve Diffie Hellman (ECDH) algorithm. With reference to FIG. 2, a flowchart illustrating the operation of an exemplary ECDH algorithm is set forth. Method 200 is merely exemplary and is not limited to the embodiments presented herein. Method 200 can be employed in many different embodiments or examples not specifically depicted or described herein. In some embodiments, the procedures, processes, and/or activities of method 200 can be performed in the order presented. In other embodiments, one or more of the procedures, processes, and/or activities of method 200 can be combined or skipped.

Method 200 depicts the operation of an ECDH algorithm that can be used in the operation depicted in FIG. 1. It should be understood that other key exchange algorithms can be used in place of ECDH. In method 200, two parties, Alice and Bob, are attempting to jointly create a key. If a secure channel was present, Alice and Bob could merely use the secure channel to transmit the key between each other. However, in the embodiment shown in method 200, a secure channel is not present. So Alice and Bob are attempting to create a key while passing information to each other via a public channel that can be snooped by a third party (e.g., Eve).

At block 202, both Alice and Bob agree on two different prime numbers g and p. The numbers g and p are openly communicated between Alice and Bob. Alice generates a secret number a (block 204). Secret number a is never transmitted between Alice and Bob. Indeed, Bob will never know the value of a. Alice then uses g, p, and a to make a computation to find a': $a'=g^a \mod p$. (block 206). Alice transmits a' to Bob (block 208)

Bob generates a secret number b (block 210). Secret number b is never transmitted between Alice and Bob. Indeed, Alice will never know the value of b. Bob then uses g, p, and b to make a computation to find b': $b'=g^b \mod p$ (block 212). Bob transmits b' to Alice (block 214).

Bob then computes $a'^b \mod p$ and Alice computes $b'^a \mod p$ (block 216). Because of an interesting property of the modulus operation, $a'^b \mod p$ and $b'^a \mod p$ have the same value, S. In addition, the modulus operation is extremely difficult to reverse. In other words, a third party (Eve) could intercept all communications between Alice and Bob and still not be able to recreate the value S. The value S is a secret value that both Alice and Bob independently generated without the need to transmit data over a secure connection. Thus, the value S can be used as a cryptographic key for further communications between Alice and Bob.

Figure 3:
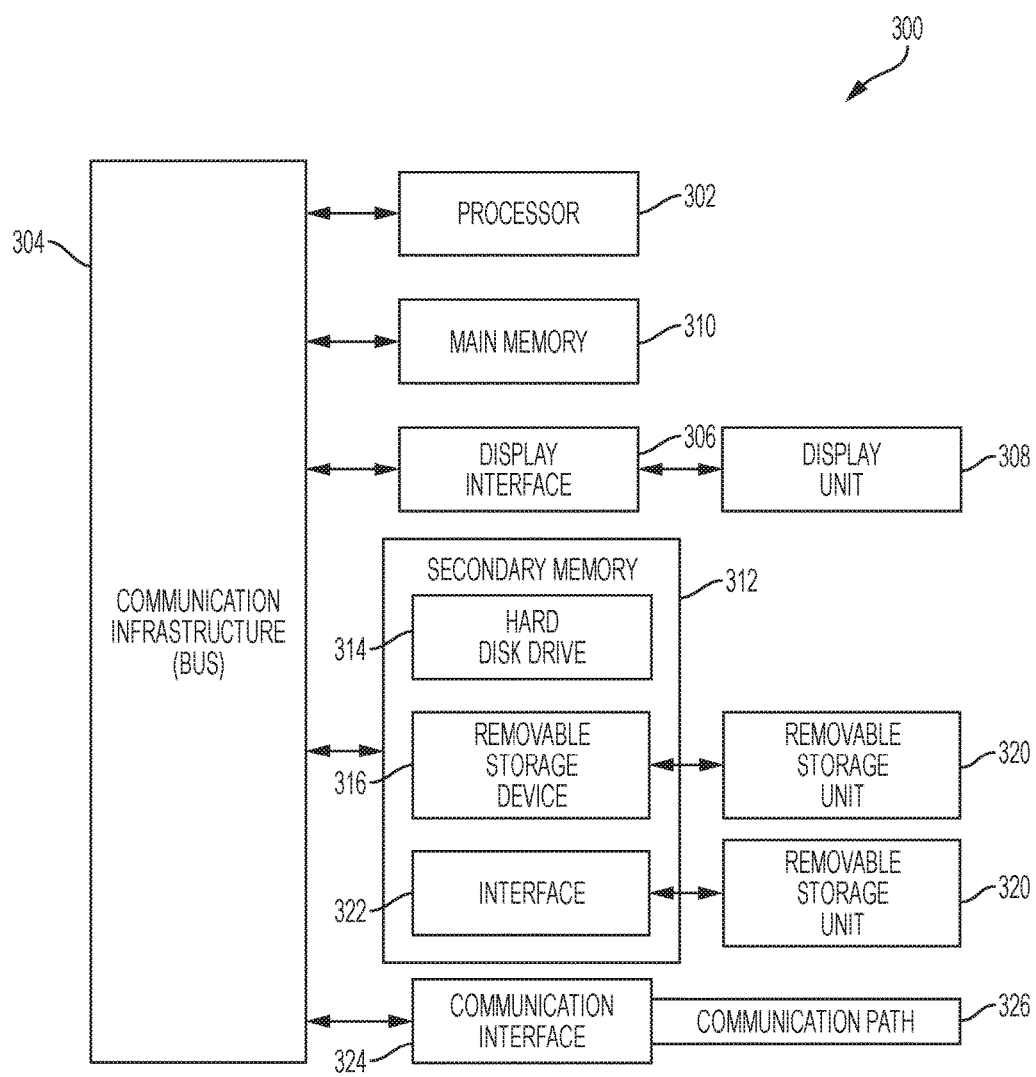
FIG. 3 depicts a computer system capable of implementing hardware components of one or more embodiments.

FIG. 3 depicts a high-level block diagram of a computer system 300, which can be used to implement an HSM in one or more embodiments. More specifically, computer system 300 can be used to implement hardware components of systems capable of performing methods described herein. Although one exemplary computer system 300 is shown, computer system 300 includes a communication path 326, which connects computer system 300 to additional systems (not depicted) and can include one or more wide area networks (WANs) and/or local area networks (LANs) such as the Internet, intranet(s), and/or wireless communication network(s). Computer system 300 and additional system are in communication via communication path 326, e.g., to communicate data between them.

Computer system 300 includes one or more processors, such as processor 302. Processor 302 is connected to a communication infrastructure 304 (e.g., a communications bus, crossover bar, or network). Computer system 300 can include a display interface 306 that forwards graphics, textual content, and other data from communication infrastructure 304 (or from a frame buffer not shown) for display on a display unit 308. Computer system 300 also includes a main memory 310, preferably random access memory (RAM), and can also include a secondary memory 312. Secondary memory 312 can include, for example, a hard disk drive 314 and/or a removable storage drive 316, representing, for example, a floppy disk drive, a magnetic tape drive, or an optical disc drive. Hard disk drive 314 can be in the form of a solid-state drive (SSD), a traditional magnetic disk drive, or a hybrid of the two. There also can be more than one hard disk drive 314 contained within secondary memory 312. Removable storage drive 316 reads from and/or writes to a removable storage unit 318 in a manner well known to those having ordinary skill in the art. Removable storage unit 318 represents, for example, a floppy disk, a compact disc, a magnetic tape, or an optical disc, etc. which is read by and written to by removable storage drive 316. As will be appreciated, removable storage unit 318 includes a computer-readable medium having stored therein computer software and/or data.

In alternative embodiments, secondary memory 312 can include other similar means for allowing computer programs or other instructions to be loaded into the computer system. Such means can include, for example, a removable storage unit 320 and an interface 322. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 320 and interfaces 322 which allow software and data to be transferred from the removable storage unit 320 to computer system 300.

Computer system 300 can also include a communications interface 324. Communications interface 324 allows software and data to be transferred between the computer system and external devices. Examples of communications interface 324 can include a modem, a network interface (such as an Ethernet card), a communications port, or a PC card slot and card, a universal serial bus port (USB), and the like. Software and data transferred via communications interface 324 are in the form of signals that can be, for example, electronic, electromagnetic, optical, or other signals capable of being received by communications interface 324. These signals are provided to communications interface 324 via communication path (i.e., channel) 326. Communication path 326 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 310 and secondary memory 312, removable storage drive 316, and a hard disk installed in hard disk drive 314. Computer programs (also called computer control logic) are stored in main memory 310 and/or secondary memory 312. Computer programs also can be received via communications interface 324. Such computer programs, when run, enable the computer system to perform the features discussed herein. In particular, the computer programs, when run, enable processor 302 to perform the features of the computer system. Accordingly, such computer programs represent controllers of the computer system. Thus it can be seen from the forgoing detailed description that one or more embodiments provide technical benefits and advantages.

Figure 4:
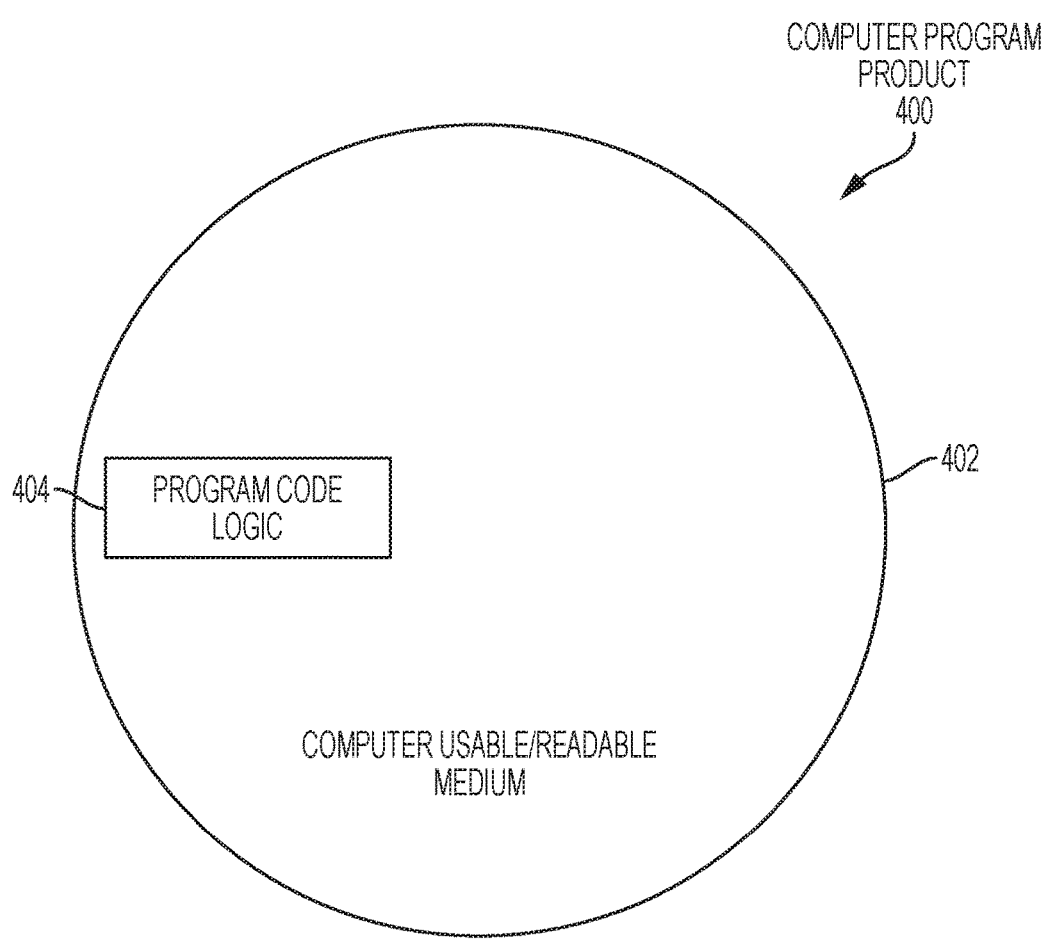
FIG. 4 depicts a diagram of a computer program product according to one or more embodiments.

Referring now to FIG. 4 a computer program product 400 in accordance with an embodiment that includes a computer-readable storage medium 402 and program instructions 404 is generally shown.

Embodiments can be a system, a method, and/or a computer program product. The computer program product can include a computer-readable storage medium (or media) having computer-readable program instructions thereon for causing a processor to carry out aspects of embodiments of the present invention.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform embodiments of the present invention.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which includes one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The descriptions presented herein are for purposes of illustration and description, but is not intended to be exhaustive or limited. Many modifications and variations will be apparent to those of ordinary skill in the art without departing from the scope and spirit of embodiments of the invention. The embodiment was chosen and described in order to best explain the principles of operation and the practical application, and to enable others of ordinary skill in the art to understand embodiments of the present invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating a transport key, the method comprising:
   generating, using a hardware processor, a key agreement pair comprising a public agreement key and a private agreement key in a second element;
   generating, using the hardware processor, a transport key based on the public agreement key in a first element;
   independently generating, using the hardware processor, the transport key in the second element;
   transmitting, using the hardware processor, information to be decrypted from the second element to the first element within an information blob, wherein the information to be decrypted is wrapped in a public master key and the information blob includes a key check value;
   decrypting, using the hardware processor, the information to be decrypted, in the first element;
   wrapping, using the hardware processor, the decrypted information, using the transport key in the first element;
   transmitting, using the hardware processor, the wrapped decrypted information to the second element; and
   unwrapping, using the hardware processor, the wrapped decrypted information using the transport key in the second element.

2. The computer-implemented method of claim 1, wherein:
   generating the transport key based on the public agreement key in the first element comprises using an elliptic curve Diffie Hellman algorithm to generate the transport key; and
   independently generating the transport key in the second element comprises using an elliptic curve Diffie Hellman algorithm to generate the transport key using the key agreement pair.

3. The computer-implemented method of claim 1, further comprising calculating a key check value for the transport key.

4. The computer-implemented method of claim 3, further comprising:
   using the key check value to validate the transport key in the second element.

5. The computer-implemented method of claim 1, further comprising:
   generating, using the hardware processor, a first signature key pair comprising a first public signature verification key and a first private signature generation key in the first element to create a first self-signed public key data object;
   generating, using the hardware processor, a second signature key pair comprising a second public signature verification key and a second private signature generation key in the second element to create a second self-signed public key data object; and
   generating, using the hardware processor, a transport key based on the public signing key in the first element.

6. The computer-implemented method of claim 1, wherein the information to be decrypted comprises a cryptographic key.

7. A computer system for exchanging a first key between a first system and a second system, comprising:
   a memory; and
   a processor system communicatively coupled to the memory;
   the processor system configured to:
      generate a key agreement pair comprising a public agreement key and a private agreement key in a second element;
      generate a transport key based on the public agreement key in a first element;
      independently generate the transport key in the second element;
      transmitting, using the processor system, information to be decrypted from the second element to the first element within an information blob, wherein the information to be decrypted is wrapped in a public master key and the information blob includes a key check value;
      decrypting, using the processor system, the information to be decrypted, in the first element;
      wrapping, using the processor system, the decrypted information, using the transport key in the first element;
      transmitting, using the processor system, the wrapped decrypted information to the second element; and
      unwrapping, using the processor system, the wrapped decrypted information using the transport key in the second element.

8. The computer system of claim 7, wherein:
   generating the transport key based on the public agreement key in the first element comprises using an elliptic curve Diffie Hellman algorithm to generate the transport key; and
   generating the transport key based on the private agreement key in the second element comprises using an elliptic curve Diffie Hellman algorithm to generate the transport key using the key agreement pair.

9. The computer system of claim 7, wherein the information blob comprises a key check value for the transport key.

10. The computer system of claim 9, further comprising:
    using the key check value to validate the transport key in the second system.

11. The computer system of claim 7, further comprising:
    generating a first signature key pair comprising a first public signature verification key and a first private signature generation key in the first element to create a first self-signed public key data object;
    generating a second signature key pair comprising a second public signature verification key and a second private signature generation key in the second element to create a second self-signed public key data object and
    generating a transport key based on the public signing key in the first element.

12. The computer system of claim 7, wherein the information to be decrypted comprises a cryptographic key.

13. A computer program product for exchanging a first key between a first system and a second system comprising:
    a non-transitory computer-readable storage medium having program instructions embodied therewith, the program instructions readable by a processor system to cause the processor system to:
       generate a key agreement pair comprising a public agreement key and a private agreement key in a second element;
       generate a transport key based on the public agreement key in a first element;
       independently generate the transport key in the second element;
       transmitting, using the processor system, information to be decrypted from the second element to the first element within an information blob, wherein the information to be decrypted is wrapped in a public master key and the information blob includes a key check value;

decrypting, using the processor system, the information to be decrypted, in the first element;

wrapping, using the processor system, the decrypted information, using the transport key in the first element;

transmitting, using the processor system, the wrapped decrypted information to the second element; and unwrapping, using the processor system, the wrapped decrypted information using the transport key in the second element.

14. The computer program product of claim 13, wherein:

generating the transport key based on the public agreement key in the first element comprises using an elliptic curve Diffie Hellman algorithm to generate the transport key; and generating the transport key based on the private agreement key in the second element comprises using an elliptic curve Diffie Hellman algorithm to generate the transport key using the key agreement pair.

15. The computer program product of claim 13, wherein the information blob comprises a key check value for the transport key.

16. The computer program product of claim 15, wherein the instructions are further configured to cause the processor system to:

use the key check value to validate the transport key in the second system.

17. The computer program product of claim 13, the instructions are further configured to cause the processor system to:

generate a signing key pair comprising a public signing key and a private signing key in the second system; and generate a transport key based on the public signing key in the first system.

\* \* \* \* \*